Aug. 28, 1962  A. GSCHWENDER  3,051,812
DEVICE FOR INDUCTIVE HEATING OF WORKPIECES
Filed Dec. 31, 1959  2 Sheets-Sheet 1

INVENTOR
ALOIS GSCHWENDER
BY
AGENT

Aug. 28, 1962  A. GSCHWENDER  3,051,812
DEVICE FOR INDUCTIVE HEATING OF WORKPIECES
Filed Dec. 31, 1959  2 Sheets-Sheet 2
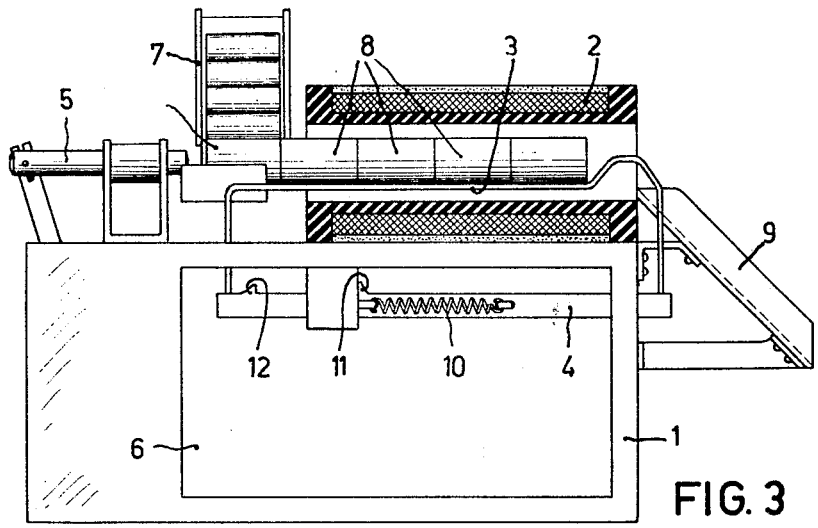
FIG. 3
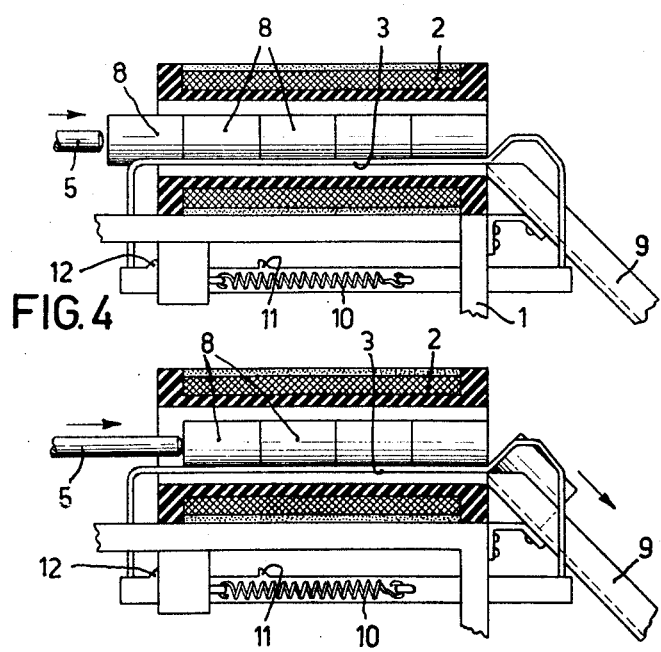
FIG. 4
FIG. 5
INVENTOR
ALOIS GSCHWENDER
BY
AGENT

United States Patent Office 3,051,812
Patented Aug. 28, 1962

3,051,812
DEVICE FOR INDUCTIVE HEATING OF WORKPIECES
Alois Gschwender, Reichenbach (Fils), Germany, assignor to North American Philips Company, Inc., New York, N.Y., a corporation of Delaware
Filed Dec. 31, 1959, Ser. No. 863,292
4 Claims. (Cl. 219—10.69)

The invention relates to a device for inductive heating of workpieces, which are conveyed in a constant order of succession through an elongated inductor, capable of containing a plurality of workpieces at the same time, the transport being performed in steps so that, after a workpiece has emerged and has been removed, the further workpieces move backwards over a short distance.

It is known to use such devices for heating sections of different substances; in this case it may be intended to anneal the objects or to heat them to forging temperature, the objects being machined further for example in a forging press, immediately thereafter.

It is known to arrange, to this end, an elongated inductor vertically and to feed the separate workpieces from below, while in the interior of the inductor a column of workpieces is erected, which assume ever increasing temperatures towards the top. The topmost workpiece, after having reached the required final temperature, is removed at the top by lifting the whole column, and it is conducted away sideways. For the supply of new workpieces the known device is provided at the lower end with a pushing rod, to which is fed a new workpiece in the rhythm of the operation, which piece is lifted until it attains the stack of workpieces located in the inductor. During a further upward movement of the pushing rod the whole column of workpieces is moved upwards and clamping claws provided laterally below the inductor lock the lowermost workpiece and hence the whole column of workpieces, when the pushing rod moves downwards again. Consequently, in this known device all the workpieces are conveyed stepwise through the inductor and at each step a workpiece is set free at the top end so that it can be removed; thereafter the whole column of workpieces is lowered over a short distance until the clamping claws provided below prevent the column from descending further.

This known device has, however, the disadvantage that the elongated, vertical inductor has a considerable chimney effect. The heating of the workpieces in the inductor produces a corresponding heating of the air between the workpieces and the inner wall of the inductor, this air thus rising upwards and brushing intensely the topmost workpiece, which have already been heated more strongly. These pieces will therefore exhibit a high scaling effect. It is furthermore disadvantageous that the vertical arrangement of the inductor frequently gives rise to difficulties, since it requires a fairly considerable height of structure and such inductive heating devices are frequently to be included in a transfer-track, to which end a vertical inductor is very little suitable. These difficulties are obviated by the present invention.

In accordance with the invention the inductor is arranged substantially horizontally; a sliding path for the workpieces, extending through the inductor and preferably cooled by water, is displaceable in its direction of length and provision is made of a pushing rod for the transport of the workpieces, the sliding track and the pushing rod being driven by a drive operating according to the rate of heating; this drive first displaces the sliding track until a workpiece emerges from the inductor, after which it moves, by means of the pushing rod, the workpieces lying on the track until the foremost workpiece falls from the track onto a pick-up or onto a transport device. It is thus ensured that at the delivery of a heated workpiece the next following workpiece, which has left already partly the inductor at the exit of the preceding workpiece, is again moved back into the effective field of the inductor, so that it can assume a completely uniformly distributed final temperature during the next operational step.

The sliding track may consist of a rail system of non-magnetic, refractory steel tubes or plates; in order to reduce wear, these strips or tubes may be coated with ceramic oxide layers or fillets of similar properties may be welded to them.

In an advantageous embodiment of the invention use is made of a drive actuating only the pushing rod, while the sliding track can be readily displaced and is subjected to a force operating in the reverse direction, which may be provided by a spring system and tends to hold the sliding track constantly in its rest position. This provides a considerable simplificaion of the driving mechanism, since it has to actuate only the pushing rod. At the beginning of the rod movement of the workpieces lying in the inductor catch the sliding track by their considerable frictional force, so that the spring mechanism is compressed and not until the sliding track has accomplished its motion the further movement of the pushing rod has the effect that all workpieces lying in the inductor are displaced on the sliding track. When this displacement has attained approximately half the length of the workpieces, the hottest workpiece can no longer bear on the sliding rails, since it projects beyond them by more than half its length, so that it tips down on a pick-up arranged underneath or on a conveyor. If the pushing rod then moves backwards, the compressed springs drive the sliding track with the workpieces lying on it backwards again and the motion of the sliding track is adjusted so that when this backward movement is accomplished, the workpiece then located at the end is again fully exposed to the effective field of the inductor.

It may be advantageous to arrange the device for inductive heating so as to be swingable in order that the inductor, the sliding track and the pushing rod can be arranged to some extent obliquely to the horizontal plane. It is known that the friction of the workpieces, particularly when they have attained a higher temperature, is fairly high and by means of such an oblique position of the sliding track the force can be reduced which is to be exerted on the workpieces by the pushing rod.

Since such inductive heating devices are often to be changed over to different sizes of workpieces it is advantageous to render the stroke of the pushing rod and, as the case may be, also the stroke of the sliding track adjustable. The displacement of the sliding track must then be chosen so great that the workpiece following an emerging workpiece and not yet having the final temperature is moved back into the effective range of the inductor and the stroke of the pushing rod is to be adapted to the length of the workpiece, while moreover, the displacement of the sliding track is to be taken into consideration.

The drawing shows two embodiments of the invention in diagrammatic views, i.e.

FIG. 3 is a variant of the embodiment of the heating device of FIG. 1, in which the workpieces are in the rest position.

FIG. 4 shows the heating device of FIG. 3, in which the sliding track is moved into the other end position.

FIG. 5 shows the heating device of FIG. 3, in which the column of workpieces has been moved to the point where the extreme workpiece is going to tip.

Figure 1:
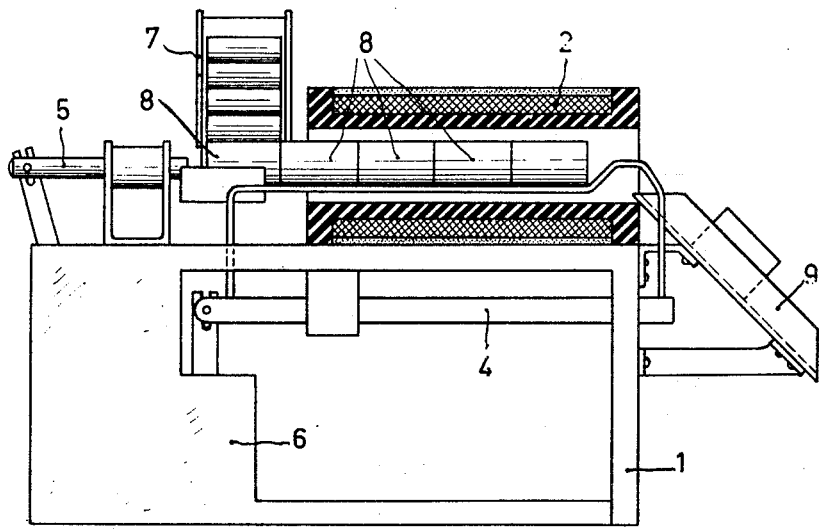
FIG. 1 shows an inductive heating devices in a side view, the inductor being illustrated in a sectional view.

In the inductive heating device shown in FIG. 1 an inductor 2 shown in a sectional view is secured to a base frame 1, the axis of this inductor being positioned horizontally; a sliding track 3 extends through this inductor. This track consists of two water-cooled, parallel tubes. Each tube is secured to a longitudinally displaceable rail 4, so that the sliding track can be moved in its longitudinal direction. To the base frame is furthermore secured a pushing rod 5 for the transport of the workpieces and the frame comprises in addition a driving mechanism 6 (not shown in detail) which provides the required movements of the pushing rod 5 and of the sliding track 3. A feeder in the form of a slanting gutter supplies new workpieces to the inductor in accordance with the required speed, which workpieces arrive in order of succession at the free end of the sliding track 3 projecting beyond the inductor. On this track the workpieces 8 travel in a constant order of succession through the inductor 2 and are conveyed at the other end via a sliding gutter towards a further process of operation.

During operation the workpieces 8 are moved through the inductor in steps; as soon as the correctly positioned workpiece 8 has attained its final temperature the drive 6 performs a displacement of the sliding track 3 to the right, so that the foremost head surface of the hottest workpiece arrives at the exit of the inductor 2. In this position the sliding track remains stationary and the pushing rod 5 starts to move the workpieces on the track to the right. When the hottest workpiece 8 has been pushed half way out of the inductor, it can no longer bear on the sliding track and tips down to arrive in the sliding gutter 9. Then the pushing rod 5 is moved backwards by the drive 6 and immediately thereafter the sliding track 3 is moved back into its rest position shown in FIG. 1. Thus the workpieces lying on the sliding track arrive at the position shown in the interior of the inductor, so that the workpiece 8 then located at the end of the sliding track is fully exposed to the effect of the inductor.

In order to ensure an undisturbed tipping of the workpieces having the final temperature, the sliding track is suitably shaped at the end of the inductor. To this end, see also FIG. 2, the tubes of the sliding track are raised approximately to the centre of the inductor and bent away from each other so that a pushed workpiece can tip onto the sliding gutter passing between the upwardly bent tube limbs.

Figure 2:
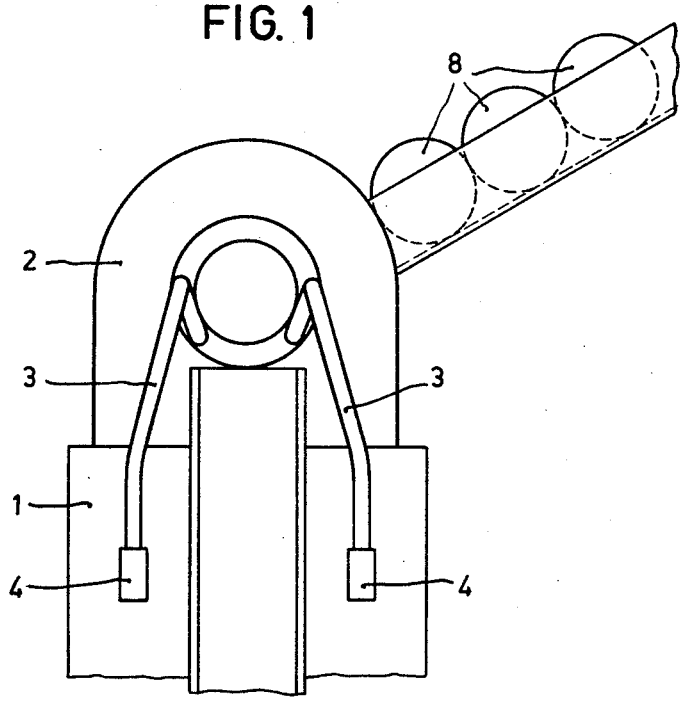
FIG. 2 shows a front view of the inductive heating deivce of FIG. 1.

A simplified form of the inductive heating device according to the invention is shown in FIGS. 3 to 5. In these figures the same reference numerals as in FIGS. 1 and 2 are used to designate corresponding parts.

As is evident from FIG. 3, the sliding track 3 is not connected with the drive 6 and is adapted to be displaced in the direction of length and is biassed by a spring 10, so that it always compresses to occupy the rest position shown in this figure. The rails 4 are provided with projections 11, 12 serving as stops and limiting the displacement of the sliding track. The drive 6 actuates only the pushing rod 5, which, upon moving to the right, exerts a pressure on the workpieces 8 located in the inductor 2.

When, in this embodiment of the invention, the workpiece 8 near the exit has attained its final temperature the pushing rod 5 becomes operative and transports the workpieces 8 to the right. Owing to the friction between the workpieces and the tubes of the sliding track 3 the latter is caught and tends the spring 10. This action terminates as soon as the stop 12 becomes operative; this position is shown in FIG. 4. It is evident that the workpiece 8, which has reached its final temperature, has arrived just at the opening of the inductor 2 and during the further movement of the pushing rod 5 the workpieces 8 are compelled to move to the right on the sliding track. This means that the extreme workpiece 8 slides to the right on the stationary sliding track 3 and arrives between the upwardly bent limbs of the track tubes. As soon as the point of gravity appears beyond the kink where the tubes are bent upwardly, the workpiece is no longer supported and tips onto the sliding gutter 9. The pushing rod 5 however, accomplishes its movement to the right into the position shown in FIG. 5. The tumbled-over workpiece 8 is completely free of the sliding track and starts moving along the sliding gutter 9.

When the pushing rod 5 moves again backwards, the sliding track 3 with the workpieces 8 lying thereon is also moved to the left by the compressed spring 10 so that the foremost workpiece 8 remains in contact with the pushing rod 5 until the stop 11 again becomes operative. Then the sliding track with the workpieces again has reached the position shown in FIG. 3 and only the pushing rod 5 moves further to the left until it arrives at its rest position. In a manner not shown a fresh workpiece arrives at the sliding track 3 from the feeder gutter 7. After the period of time required to cause the workpiece then lying at the extreme right-hand end as shown in the drawing to attain its final temperature the operation described above is repeated.

What is claimed is:

1. A device for inductive heating of workpieces that are successively transported stepwise through an elongated, horizontally-arranged inductor capable of simultaneously accommodating a plurality of workpieces through one end of said inductor and emerging from the opposite end thereof comprising a substantially parallel dual sliding track extending through the interior of said inductor for supporting said workpieces, a push rod for transporting each of said workpieces along said sliding track, a drive means for said push rod operated in accordance with the heating rate of said device, means displacing said dual sliding track horizontally in said inductor until a workpiece emerges from said inductor and is ejected from the inductor by means of said push rod, and gravity slide means for conveying away each of said ejected workpieces.

2. A device for inductive heating of workpieces that are successively transported stepwise through a elongated, horizontally-arranged inductor capable of simultaneously accommodating a plurality of workpieces through one end of said inductor and emerging from the opposite end thereof comprising a substantially parallel dual movable sliding track extending through the interior of said inductor for supporting said workpieces, a spring operatively connected to said sliding track for biasing said track to its initial position, a push rod for transporting each of said workpieces along said sliding track, a drive means for said push rod operated in accordance with the heating rate of said device, said spring displacing said sliding track horizontally a limited distance until a workpiece emerges from said inductor and is ejected from the inductor by means of said push rod, and gravity slide means for conveying away each of said ejected workpieces.

3. A device for inductive heating of workpieces as claimed in claim 1 further comprising means for adjusting the stroke of said push rod.

4. A device for inductive heating of workpieces as claimed in claim 1 further comprising means for adjusting the displacement of said sliding track.

References Cited in the file of this patent

UNITED STATES PATENTS

| | | |
|---|---|---|
| 2,604,577 | Strickland et al. | July 22, 1952 |
| 2,819,370 | Osborn | Jan. 7, 1958 |
| 2,876,325 | Baffrey | Mar. 3, 1959 |
| 2,965,369 | Acker et al. | Dec. 20, 1960 |